Patented Mar. 30, 1948

2,438,880

UNITED STATES PATENT OFFICE 2,438,880

RIBOFLAVIN SOLUTION

Max Frank Furter, Upper Montclair, and Max Hoffer, Nutley, N. J., assignors to Hoffmann-La Roche Inc., Nutley, N. J., a corporation of New Jersey No Drawing. Application March 19, 1946, Serial No. 655,599

3 Claims. (Cl. 167—81)

Our invention relates to aqueous solutions of riboflavin, also known as vitamin $B_2$. Riboflavin is relatively insoluble in water. U. S. P. No. 2,256,604 and U. S. P. No. 2,349,986 give the solubility of riboflavin in water as 0.013 percent.

Attempts have been made heretofore to solubilize this vitamin by means of chemical agents. Auhagen, U. S. P. No. 2,256,604, suggests the use of salts such as sodium nicotinate. Preiswerk, U. S. P. No. 2,349,986, discloses the use of 2,4-dihydroxy-benzoic acid salts as well as salts of mono-alkyl ethers of 2,4-dihydroxy-benzoic acid.

It is known that many diseases caused by vitamin deficiency are of a complex nature and may be due to the lack of several vitamins at the same time. This has been found true in the case of the so-called vitamin B complex. For example, for certain conditions it is highly advisable to use a combination of vitamins $B_1$ and $B_2$. It is, therefore, of importance to have suitable preparations for administering riboflavin in conjunction with one or more other vitamin B complex members.

The preparation of a composition of matter containing riboflavin as well as other vitamin B fractions introduces a significant consideration in the matter of pH control. It is known that vitamin $B_1$ in the form of its hydrochloride is stable in strongly acid solution. In weakly acid solution, however, it decomposes. Thus at a pH of 5–6 it undergoes cleavage and loses its activity. In neutral and alkaline solutions it is unstable. It will be apparent, therefore, that if riboflavin is to be administered conjointly with vitamin $B_1$ hydrochloride, a pH below 5 is necessary to maintain stability of the vitamin $B_1$. Accordingly, a solubilizer for riboflavin which is to be employed in such a composition must be one which will not only solubilize the riboflavin, but one which will itself be stable at a pH below 5. The solubilizers shown in Preiswerk Patent 2,349,986 are not stable at a pH below 5, since they decompose in aqueous acidic solution at a low pH to yield the corresponding free acid or the mono-alkyl ether of the acid, depending upon whether or not the salt is a salt of 2,4-dihydroxy-benzoic acid or of its mono-alkyl ether. Not only is the salt broken down, but the 2,4-dihydroxy-benzoic acid which is liberated decomposes to form resorcinol.

We have found that if salts of 2,5-dihydroxy-benzoic acid (gentisic acid) are employed as solubilizers for riboflavin, the solution of riboflavin may be kept at a pH below 5 without decomposition of the solubilizer. At a pH below 5, the gentisic acid is present in the solution both in the free state and in the form of its salt.

While our invention in general relates to the preparation of riboflavin solution at a pH below 5 and containing gentisic acid and salts thereof for solubilizing purposes, it will be apparent that specific poly-vitamin preparations for parenteral administration may be prepared wherein the pH is maintained within a specific range below pH 5. Pantothenic acid and salts thereof are relatively unstable at a low pH, for example, below a pH of 4. Accordingly, if the riboflavin solution contains pantothenic acid or salts thereof, it is desirable to maintain a pH above 4. Our preparation which contains riboflavin and gentisic acid and salts thereof, is stable at a pH of 4 to 5, in which range pantothenic acid and salts thereof are relatively stable. It will be seen, therefore, that if the composition contains riboflavin vitamin $B_1$, and pantothenic acid or salts thereof, a desirable pH range to maintain would be pH 4 to 5.

Vitamin $B_6$ may also be employed in the composition since that vitamin is stable at a pH below 5 and more particularly at our preferred range of 4 to 5.

It is desirable to add a small proportion of an anti-oxidant such as vitamin C or iso-ascorbic acid for the purpose of stabilizing the gentisic acid solubilizer. Vitamin C is particularly desirable not only for its anti-oxidant properties but for its therapeutic value.

The maintenance of a proper pH in our novel vitamin composition can be carried out by the addition of sufficient salt-forming base to give the desired pH range, and also to produce salts or gentisic acid. Various bases may be employed, e. g., bases of alkali metals, or ammonia, or organic bases. For example, we may employ sodium hydroxide, sodium carbonate, sodium bicarbonate, ammonium hydroxide, lithium hydroxide, methylamine, dimethylamine, morpholine, or the like. Sodium bicarbonate is our preferred base.

In general the concentration of the solubilizer present in our novel solution represents about 5 to 10 times that of the concentration of riboflavin. The solubilizer itself comprises gentisic acid and a salt thereof with the particular base employed for neutralization purposes. The proportion of free acid to the salt will vary depending upon the pH, the higher the pH the greater the proportion of the salt.

Using as a solubilizer 50 percent gentisic acid and 50 percent sodium salt thereof, we have been able to dissolve riboflavin in water to the following degrees, the pH being below 5:

2.5 percent solubilizer____3.1 mg. $B_2$ per cc. water
5.0 percent solubilizer____6.3 mg. $B_2$ per cc. water
10.0 percent solubilizer___16.4 mg. $B_2$ per cc. water The manufacture of our composition involves in general preparing a water solution of gentisic acid, adding a base to that solution to form a composition containing both gentisic acid and salts thereof, followed by the addition of riboflavin, usually while warming, to this composition. If additional vitamins are to be added, the composition is cooled and such adjuncts as vitamin $B_1$ niacinamide, pantothenic acid salt, vitamin C, etc., are added.

An antiseptic (such as chlorobutanol) and an anesthetic (such as benzyl alcohol) may be incorporated if desired.

The product is diluted with water to the desired volume, and the pH adjusted to the desired value.

It is desirable to prepare our composition in an inert atmosphere as a precautionary measure to avoid decomposition of ingredients. For this purpose, carbon dioxide or nitrogen may be employed, preferably carbon dioxide. The operation of ampul-filling should also preferably be carried out in an inert atmosphere.

Specific examples of our novel composition are given for purposes of illustration:

*Example 1*

2 gm. gentisic acid are dissolved in 75 cc. water, and thereafter 0.926 gm. sodium bicarbonate are added. 0.120 gm. riboflavin are then dissolved, with warming, in this solution, and the solution is cooled. Thereafter 1 gm. vitamin C, 0.200 gm. vitamin $B_1$, and 0.200 gm. niacinamide are added to the cooled solution. 0.5 gm. chlorobutanol and 3 gm. benzyl alcohol are incorporated, and the solution is adjusted with water to the desired volume, e. g., 100 cc. All operations are conducted in an atmosphere of carbon dioxide.

*Example 2*

6.8 gm. gentisic acid are dissolved in 150 cc. water, and thereafter there are added 3.78 gm. sodium bicarbonate. 0.600 gm. riboflavin are then dissolved in the solution, with warming, and the solution is cooled. Thereafter there are added 3.0 gm. ascorbic acid, 2.0 gm. vitamin $B_1$, .60 gm. vitamin $B_6$, 4.0 gm. niacinamide, and .60 gm. sodium pantothenate. 1 gm. chlorobutanol and 6 gm. benzyl alcohol are then incorporated in the composition, and the final liquid is then adjusted to the desired volume, e. g., 200 cc., with water. The operations are carried out in an atmosphere of carbon dioxide.

We claim:

1. An aqueous solution containing riboflavin in a concentration higher than 0.013 percent, gentisic acid, and a water-soluble salt of gentisic acid and a member of the group consisting of alkali metals, ammonia, and organic bases, said solution being at a pH less than 5.

2. The composition of claim 1 in which the salt is the sodium salt of gentisic acid.

3. The composition of claim 1 in which the pH is within the range of 4 to 5.

MAX FRANK FURTER.
MAX HOFFER.

REFERENCES CITED

The following references are of record in the file of this patent:

UNITED STATES PATENTS

| Number | Name | Date |
|---|---|---|
| 2,349,986 | Preiswerk | May 30, 1944 |
| 2,358,331 | Jurist | Sept. 19, 1944 |
| 2,395,378 | Miller | Feb. 19, 1946 |
| 2,407,412 | Frost | Sept. 10, 1946 |
| 2,407,624 | Bird et al. | Sept. 17, 1946 |

---

Certificate of Correction

Patent No. 2,438,880.                                  March 30, 1948.

MAX FRANK FURTER ET AL.

It is hereby certified that error appears in the printed specification of the above numbered patent requiring correction as follows: Column 2, line 37, for "or gentisic" read *of gentisic*; and that the said Letters Patent should be read with this correction therein that the same may conform to the record of the case in the Patent Office.

Signed and sealed this 1st day of June, A. D. 1948.

[SEAL]

THOMAS F. MURPHY,
*Assistant Commissioner of Patents.* able to dissolve riboflavin in water to the following degrees, the pH being below 5:

2.5 percent solubilizer____3.1 mg. B₂ per cc. water
5.0 percent solubilizer____6.3 mg. B₂ per cc. water
10.0 percent solubilizer___16.4 mg. B₂ per cc. water The manufacture of our composition involves in general preparing a water solution of gentisic acid, adding a base to that solution to form a composition containing both gentisic acid and salts thereof, followed by the addition of riboflavin, usually while warming, to this composition. If additional vitamins are to be added, the composition is cooled and such adjuncts as vitamin B₁ niacinamide, pantothenic acid salt, vitamin C, etc., are added.

An antiseptic (such as chlorobutanol) and an anesthetic (such as benzyl alcohol) may be incorporated if desired.

The product is diluted with water to the desired volume, and the pH adjusted to the desired value.

It is desirable to prepare our composition in an inert atmosphere as a precautionary measure to avoid decomposition of ingredients. For this purpose, carbon dioxide or nitrogen may be employed, preferably carbon dioxide. The operation of ampul-filling should also preferably be carried out in an inert atmosphere.

Specific examples of our novel composition are given for purposes of illustration:

Example 1

2 gm. gentisic acid are dissolved in 75 cc. water, and thereafter 0.926 gm. sodium bicarbonate are added. 0.120 gm. riboflavin are then dissolved, with warming, in this solution, and the solution is cooled. Thereafter 1 gm. vitamin C, 0.200 gm. vitamin B₁, and 0.200 gm. niacinamide are added to the cooled solution. 0.5 gm. chlorobutanol and 3 gm. benzyl alcohol are incorporated, and the solution is adjusted with water to the desired volume, e. g., 100 cc. All operations are conducted in an atmosphere of carbon dioxide.

Example 2

6.8 gm. gentisic acid are dissolved in 150 cc. water, and thereafter there are added 3.78 gm. sodium bicarbonate. 0.600 gm. riboflavin are then dissolved in the solution, with warming, and the solution is cooled. Thereafter there are added 3.0 gm. ascorbic acid, 2.0 gm. vitamin B₁, .60 gm. vitamin B₆, 4.0 gm. niacinamide, and .60 gm. sodium pantothenate. 1 gm. chlorobutanol and 6 gm. benzyl alcohol are then incorporated in the composition, and the final liquid is then adjusted to the desired volume, e. g., 200 cc., with water. The operations are carried out in an atmosphere of carbon dioxide.

We claim:
1. An aqueous solution containing riboflavin in a concentration higher than 0.013 percent, gentisic acid, and a water-soluble salt of gentisic acid and a member of the group consisting of alkali metals, ammonia, and organic bases, said solution being at a pH less than 5.
2. The composition of claim 1 in which the salt is the sodium salt of gentisic acid.
3. The composition of claim 1 in which the pH is within the range of 4 to 5.

MAX FRANK FURTER.
MAX HOFFER.

REFERENCES CITED

The following references are of record in the file of this patent:

UNITED STATES PATENTS

| Number | Name | Date |
|---|---|---|
| 2,349,986 | Preiswerk | May 30, 1944 |
| 2,358,331 | Jurist | Sept. 19, 1944 |
| 2,395,378 | Miller | Feb. 19, 1946 |
| 2,407,412 | Frost | Sept. 10, 1946 |
| 2,407,624 | Bird et al. | Sept. 17, 1946 |

---

Certificate of Correction

Patent No. 2,438,880.    March 30, 1948.

MAX FRANK FURTER ET AL.

It is hereby certified that error appears in the printed specification of the above numbered patent requiring correction as follows: Column 2, line 37, for "or gentisic" read *of gentisic*; and that the said Letters Patent should be read with this correction therein that the same may conform to the record of the case in the Patent Office.

Signed and sealed this 1st day of June, A. D. 1948.

[SEAL]

THOMAS F. MURPHY,
*Assistant Commissioner of Patents.*